(12) United States Patent
Breebaart et al.

(10) Patent No.: US 10,978,079 B2
(45) Date of Patent: Apr. 13, 2021

(54) AUDIO ENCODING AND DECODING USING PRESENTATION TRANSFORM PARAMETERS

(71) Applicants: Dolby Laboratories Licensing Corporation, San Francisco, CA (US); Dolby International AB, Amsterdam Zuidoost (NL)

(72) Inventors: Dirk Jeroen Breebaart, Ultimo (AU); David Matthew Cooper, Carlton (AU); Leif Jonas Samuelsson, Sundbyberg (SE); Jeroen Koppens, Södertälje (SE); Rhonda Joy Wilson, San Francisco, CA (US); Heiko Purnhagen, Sundbyberg (SE); Alexander Stahlmann, Bubenreuth (DE)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 427 days.

(21) Appl. No.: 15/754,654

(22) PCT Filed: Aug. 24, 2016

(86) PCT No.: PCT/US2016/048497
§ 371 (c)(1),
(2) Date: Feb. 23, 2018

(87) PCT Pub. No.: WO2017/035281
PCT Pub. Date: Mar. 2, 2017

(65) Prior Publication Data
US 2020/0227052 A1 Jul. 16, 2020

Related U.S. Application Data

(60) Provisional application No. 62/209,735, filed on Aug. 25, 2015.

(30) Foreign Application Priority Data

Oct. 9, 2015 (EP) ..................... 15189094

(51) Int. Cl.
*G10L 19/008* (2013.01)
*G06F 3/16* (2006.01)
(Continued)

(52) U.S. Cl.
CPC ............. *G10L 19/008* (2013.01); *G06F 3/16* (2013.01); *H04L 65/601* (2013.01);
(Continued)

(58) Field of Classification Search
CPC ... G10L 19/008; G10L 19/00; G10L 19/0212; G10L 19/167; G10L 19/0017;
(Continued)

(56) References Cited

U.S. PATENT DOCUMENTS 7,876,904 B2  1/2011  Ojala
8,175,280 B2  5/2012  Villemoes
(Continued)

FOREIGN PATENT DOCUMENTS

CN  1369189  9/2002
CN  101202043  6/2008
(Continued)

OTHER PUBLICATIONS

Wightman, F.L. et al "Headphone Simulation of Free-Field Listening. I:Stimulus Synthesis" J. Acoustic Soc. Am. 85, 858-867, Oct. 1988.
(Continued)

*Primary Examiner* — Huyen X Vo

(57) ABSTRACT

A method for encoding an input audio stream including the steps of obtaining a first playback stream presentation of the input audio stream intended for reproduction on a first audio
(Continued)

reproduction system, obtaining a second playback stream presentation of the input audio stream intended for reproduction on a second audio reproduction system, determining a set of transform parameters suitable for transforming an intermediate playback stream presentation to an approximation of the second playback stream presentation, wherein the transform parameters are determined by minimization of a measure of a difference between the approximation of the second playback stream presentation and the second playback stream presentation, and encoding the first playback stream presentation and the set of transform parameters for transmission to a decoder.

19 Claims, 9 Drawing Sheets

(51) Int. Cl.
H04L 29/06 (2006.01)
H04S 1/00 (2006.01)
H04S 7/00 (2006.01)

(52) U.S. Cl.
CPC ............ *H04L 65/607* (2013.01); *H04S 1/007* (2013.01); *H04S 7/305* (2013.01); *H04S 2400/01* (2013.01); *H04S 2400/03* (2013.01); *H04S 2400/07* (2013.01)

(58) Field of Classification Search
CPC ....... G10L 19/02; G10L 19/032; G10L 19/24; G10L 19/005; G10L 19/022; G10L 19/04; G10L 19/06; G10L 19/12; G10L 19/173; G10L 19/20; G10L 2021/0575; G10L 19/0204; G10L 19/16; G10L 19/18; G10L 19/22; G10L 2021/02082; G06F 3/16; H04L 65/601; H04L 65/607; H04L 12/1827; H04L 47/10; H04L 51/06; H04L 67/04; H04L 67/18; H04L 67/28; H04L 29/06; H04L 69/22; H04S 1/007; H04S 7/305; H04S 2400/07; H04S 2400/03; H04S 2400/01; H04S 1/00; H04N 7/24; H04N 21/238; H04N 21/438; H04N 21/2662; H04N 21/4621; H04N 21/64792

See application file for complete search history.

(56) References Cited

U.S. PATENT DOCUMENTS

| | | | |
|---|---|---|---|
| 8,234,122 B2 | 7/2012 | Kim | |
| 8,265,284 B2 | 9/2012 | Breebaart | |
| 8,363,865 B1 | 1/2013 | Bottum | |
| 8,654,983 B2 | 2/2014 | Breebaart | |
| 8,687,829 B2 | 4/2014 | Hilpert | |
| 8,908,874 B2 | 12/2014 | Johnston | |
| 8,965,000 B2 | 2/2015 | Engdegard | |
| 2006/0045294 A1 | 3/2006 | Smyth | |
| 2007/0160218 A1 | 7/2007 | Jakka | |
| 2008/0181432 A1* | 7/2008 | Jeong | H04S 1/002 381/94.1 |
| 2008/0273708 A1* | 11/2008 | Sandgren | H04S 1/005 381/63 |
| 2008/0281602 A1* | 11/2008 | Van Schijndel | G10L 19/00 704/500 |
| 2009/0012796 A1* | 1/2009 | Jung | G10L 19/008 704/500 |
| 2009/0043591 A1* | 2/2009 | Breebaart | G10L 19/008 704/500 |
| 2009/0067636 A1 | 3/2009 | Faure | |
| 2010/0246832 A1 | 9/2010 | Villemoes | |
| 2011/0123031 A1 | 5/2011 | Ojala | |
| 2011/0135098 A1 | 6/2011 | Kuhr | |
| 2011/0182432 A1* | 7/2011 | Ishikawa | G10L 19/008 381/22 |
| 2011/0264456 A1 | 10/2011 | Koppens | |
| 2012/0259643 A1 | 10/2012 | Engdegard | |
| 2012/0314876 A1 | 12/2012 | Vilkamo | |
| 2013/0243200 A1 | 9/2013 | Horbach | |
| 2013/0272527 A1 | 10/2013 | Oomen | |
| 2014/0119551 A1 | 5/2014 | Bharitkar | |
| 2014/0153727 A1 | 6/2014 | Walsh | |
| 2014/0355794 A1 | 12/2014 | Morrell | |
| 2014/0355795 A1 | 12/2014 | Xiang | |
| 2015/0213807 A1 | 7/2015 | Breebaart | |
| 2016/0037279 A1* | 2/2016 | Borne | H04S 3/002 348/515 |
| 2018/0035233 A1 | 2/2018 | Fielder | |

FOREIGN PATENT DOCUMENTS

| | | |
|---|---|---|
| CN | 101529501 | 9/2009 |
| CN | 101933344 | 12/2010 |
| CN | 104471641 | 3/2015 |
| EP | 2146522 | 1/2010 |
| JP | 2007221483 | 8/2007 |
| WO | 2012/033950 | 3/2012 |
| WO | 2014/091375 | 12/2013 |
| WO | 2014/036085 | 3/2014 |
| WO | 2014/036121 | 3/2014 |
| WO | 2014/046923 | 3/2014 |
| WO | 2014/111765 | 7/2014 |
| WO | 2014/111829 | 7/2014 |
| WO | 2015/010983 | 1/2015 |
| WO | 2015/011055 | 1/2015 |

OTHER PUBLICATIONS

Vercoe, B. et al "Structured Audio: Creation, Transmission, and Rendering of Parametric Sound Representations" Proc. of the IEEE, vol. 86, No. 5, May 1998, pp. 922-940.
Klepko, John "5-Channel Microphone Array with Binaural-Head for Multichannel Reproduction" Faculty of Music McGill University, Montreal Sep. 1999.
Breebaart, J. et al "Multi-Channel Goes Mobile: MPEG Surround Binaural Rendering" AES International Conference, Audio for Mobile and Handheld Devices, Sep. 2, 2006, pp. 1-13.
Faller, C. et al "Binaural Cue Coding—Part II: Schemes and Applications" IEEE Transactions on Speech and Audio Processing, vol. 11, No. 6, Nov. 2003, pp. 520-531.
Anonymous: "Dolby AC-4: Audio Delivery for Next-Generation Entertainment Services" Jun. 1, 2015.
Paulus, J. et al MPEG-D Spatial Audio Object Coding for Dialogue Enhancement (SAOC-DE), AES presented at the 138th Convention, May 7-10, 2015, Warsaw Poland, pp. 1-11.
Breebaart, J. et al "Binaural Cues for Multiple Sound Sources" Spatial Audio Processing: MPEG Surround and other Applications, John Wiley & Sons, Ltd., Jan. 2007, pp. 139-154.
ETSI TS 103 190-2 v1.1.0 "Digital Audio Compression (AC-4) Standard Part 2: Immersive and Personalized Audio" vol. Broadcast, Jul. 10, 2015.
Robinson, C. Q. "Scalable Format and Tools to Extend the Possibilities of Cinema Audio" SMPTE Meeting Presentation, pp. 63-69, 2012.
Riedmiller, J. et al "Immersive & Personalized Audio: A Practical System for Enabling Interchange, Distribution & Delivery of Next Generation Audio Experiences" SMPTE Annual Technical Conference & Exhibition, Oct. 20-23, 2014, pp. 1-23.
Brandenburg, K. et al "Overview of MPEG Audio: Current and Future Standards for Low-Bit-Rate Audio Coding" Journal of the Audio Engineering Society, vol. 45, No. 1/2, Jan./Feb. 1997, pp. 4-21.
Dressler, Roger "Dolby Surround Pro Logic Decoder Principles of Operation".
Kim, K. et al "Binaural Decoding for Efficient Multi-Channel Audio Service in Network Environment" IEEE 11th Consumer Communications and Networking Conference, Jan. 10-13, 2014.

(56) References Cited

OTHER PUBLICATIONS

Talagala, D.S. et al "Binaural Localization of Speech Sources in the Median Plane Using Cepstral HRTF Extraction" Signal Processing Conference (EUSIPCO), 2014 Proceedings of the 22nd European Publication, pp. 2055-2059.

Stewart, Rebecca "Spatial Auditory Display for Acoustics and Music Collections" a Dissertation submitted in partial fulfillment of the requirements for the degree of Doctor of Philosophy, 2010.

Pelzer, S. et al "Integrating Real-Time Room Acoustics Simulation into a CAD Modeling Software to Enhance the Architectural Design Process" buildings, Apr. 21, 2014, pp. 113-138.

Jot, Jean-Marc et al "Beyond Surround Sound-Creation, Coding and Reproduction of 3-D Audio Soundtracks" AES presented at the 131st Convention, Oct. 20-23, 2011, New York, USA.

Engdegard, J. et al "Spatial Audio Object Coding (SAOC)—The Upcoming MPEG Standard on Parametric Object Based Audio Coding" AES Convention 124, May 1, 2008, pp. 1-15.

\* cited by examiner

AUDIO ENCODING AND DECODING USING PRESENTATION TRANSFORM PARAMETERS

CROSS-REFERENCE TO RELATED APPLICATIONS

This application claims priority from U.S. Provisional Application No. 62/209,735 filed 25 Aug. 2015 and European Patent Application No. 15189094.4 filed 9 Oct. 2015, which are both hereby incorporated by reference in their entirety.

FIELD OF THE INVENTION

The present invention relates to the field of signal processing, and, in particular, discloses a system for the efficient transmission of audio signals having spatialization components i.e. audio components associated with different spatial locations.

BACKGROUND OF THE INVENTION

Any discussion of the background art throughout the specification should in no way be considered as an admission that such art is widely known or forms part of common general knowledge in the field.

Content creation, coding, distribution and reproduction of audio are traditionally performed in a channel based format, that is, one specific target playback system is envisioned for content throughout the content ecosystem. Examples of such target playback systems audio formats are mono, stereo, 5.1, 7.1, and the like.

If content is to be reproduced on a different playback system than the intended one, a downmixing or upmixing process can be applied. For example, 5.1 content can be reproduced over a stereo playback system by employing specific downmix equations. Another example is playback of stereo encoded content over a 7.1 speaker setup, which may comprise a so-called upmixing process, that could or could not be guided by information present in the stereo signal. A system capable of upmixing is Dolby Pro Logic from Dolby Laboratories Inc (Roger Dressler, "Dolby Pro Logic Surround Decoder, Principles of Operation", www.Dolby.com).

An alternative audio format system is an audio object format such as that provided by the Dolby Atmos system, see Robinson, C. Q., Mehta, S., & Tsingos, N. (2012) "Scalable format and tools to extend the possibilities of cinema audio" Motion Imaging Journal, SMPTE, 121(8), 63-69. In this type of format, objects are defined to have a particular location around a listener, which may be time varying. In such object-based format, the content is represented in a way invariant to a particular playback or reproduction system. Consequently, a dedicated rendering process is required to transform the content into a presentation suitable for a specific playback system such as a loudspeaker setup or headphones.

When stereo, multi-channel or object-based content is to be reproduced over headphones, it is often desirable to simulate a multi-channel speaker setup (for channel-based content) or a set of virtual sound sources (for object-based content) by means of head-related impulse responses (HRIRs), or binaural room impulse responses (BRIRs), which simulate the acoustical pathway from each loudspeaker to the ear drums, in an anechoic or echoic (simulated) environment, respectively. In particular, audio signals can be convolved with HRIRs or BRIRs to re-instate inter-aural level differences (ILDs), inter-aural time differences (ITDs) and spectral cues that allow the listener to determine the location of each individual channel. The simulation of an acoustic environment (reverberation) also helps to achieve a certain perceived distance. Turning to FIG. 1, there is illustrated a schematic overview of the processing flow for rendering two object or channel signals $x_i$ 10, 11, being read out of a content store 12 for processing by 4 HRIRs e.g. 14. The HRIR outputs are then summed 15, 16, for each channel signal, so as to produce headphone outputs for playback to a listener via headphones 18. The basic principle of HRIRs is, for example, explained in Wightman, F. L., and Kistler, D. J. (1989b). "Headphone simulation of free-field listening. I. Stimulus synthesis," J. Acoust. Soc. Am. 85, 858-867. The resulting stereo headphone signal 15, 16 is often referred to as a binaural signal, a binaural presentation, or a (binaural) headphone presentation. Moreover, such binaural presentation is intended (or specifically designed) to be reproduced over headphones, as opposed to a loudspeaker presentation which is intended to be reproduced on a loudspeaker setup that matches the channels present in the loudspeaker presentation signal(s). These different reproduction systems are referred to as modalities, e.g., one playback modality consists of headphones, while another playback or reproduction modality comprises one or more loudspeakers. Irrespective of the playback modality, different presentations (stereo, binaural, 5.1) can be rendered (generated) from an input stream such as a multi-channel or object-based content format. Ideally, to ensure that artistic intent is conveyed correctly to the listener, presentations are rendered or generated for specific playback modalities. For headphones playback, this implies the application of HRIRs or BRIRs to create a binaural presentation, while for loudspeakers, amplitude panning techniques are commonly used. Such rendering process can thus be applied to channel-based input content (5.1, 7.1 and alike), as well as to immersive, object-based content such as Dolby Atmos. For the latter, amplitude panning (for loudspeaker presentations) or BRIRs (for headphone presentations) are typically used on every input object independently, followed by summation of the individual object contributions to the resulting binaural signal.

The convolution process to produce a binaural presentation intended for playback on headphones can be constructed such that the sound source localization cues present in the (anechoic) HRTFs are reinstated for every input independently, depending on the (intended, perceived) position of an input channel or object, while the echoic simulated environment can be, at least in part, shared by a common algorithm across two or more of the inputs. For this purpose, one or more input signals are mixed or combined into one or more environment simulation algorithm input signals, which is/are subsequently processed to generate the environment simulation output signals that can be combined with the output of the anechoic HRTF convolution process. The environment simulation algorithm can simulate early reflections, late reverberation, or both, and can be implemented by means of known techniques such as convolution, delays, feedback-delay networks, all-pass filters, and alike.

The HRIR/BRIR convolution approach comes with several drawbacks, one of them being the substantial amount of convolution processing that is required for headphone playback. The HRIR or BRIR convolution needs to be applied for every input object or channel separately, and hence complexity typically grows linearly with the number of channels or objects. As headphones are often used in conjunction with battery-powered portable devices, a high computational complexity is not desirable as it may substantially shorten battery life. Moreover, with the introduction of object-based audio content, which may comprise say more than 100 objects active simultaneously, the complexity of HRIR convolution can be substantially higher than for traditional channel-based content.

One solution to reduce decoder-side computational load is to apply the convolution processes further upstream in the processing chain. For example, during the content creation or encoding stage. In this particular case, which is referred to as 'binaural pre-rendering', the resulting binaural signal or binaural presentation created during the pre-rendering stage contains all localization cues intended for headphone playback and no further processing is required at the reproduction device. The drawback of this method is that the introduced sound source localization cues that are present in HRIRs (such as interaural time differences, ITDs, interaural level differences ILDs, spectral cues and reverberation) degrade the perceived quality when this particular binaural representation is reproduced over loudspeakers, because these localization cues will then effectively be applied twice; once algorithmically by the pre-rendering step, and once acoustically, as a result of the acoustic pathway between loudspeakers and the ears of the listener.

SUMMARY OF THE INVENTION

It is an object of the invention, in its preferred form to provide an improved form of encoding and decoding of audio signals for reproduction.

In accordance with a first aspect of the present invention, there is provided a method of encoding an input audio stream having one or more audio components, wherein each audio component is associated with a spatial location, the method including the steps of obtaining a first playback stream presentation of the input audio stream, the first playback stream presentation is a set of M1 signals intended for reproduction on a first audio reproduction system, obtaining a second playback stream presentation of the input audio stream, the second playback stream presentation is a set of M2 signals intended for reproduction on a second audio reproduction system, determining a set of transform parameters suitable for transforming an intermediate playback stream presentation to an approximation of the second playback stream presentation, wherein the intermediate playback stream presentation is one of the first playback stream presentation, a down-mix of the first playback stream presentation, and an up-mix of the first playback stream presentation, wherein the transform parameters are determined by minimization of a measure of a difference between the approximation of the second playback stream presentation and the second playback stream presentation, and encoding the first playback stream presentation and the set of transform parameters for transmission to a decoder.

In accordance with a second aspect of the present invention, there is provided a method of decoding playback stream presentations from a data stream, the method including the steps of receiving and decoding a first playback stream presentation, the first playback stream presentation being a set of M1 signals intended for reproduction on a first audio reproduction system, receiving and decoding a set of transform parameters suitable for transforming an intermediate playback stream presentation into an approximation of a second playback stream presentation, the second playback stream presentation being a set of M2 signals intended for reproduction on a second audio reproduction system, wherein the intermediate playback stream presentation is one of the first playback stream presentation, a down-mix of the first playback stream presentation, and an up-mix of the first playback stream presentation, wherein the transform parameters ensure that a measure of a difference between the approximation of the second playback stream presentation and the second playback stream presentation is minimized, and applying the transform parameters to the intermediate playback stream presentation to produce the approximation of the second playback stream presentation.

With this decoding scheme, the data stream will contain sufficient information to decode both a first audio playback stream presentation and a second audio playback stream presentation. If the desired output audio reproduction system corresponds to the first audio reproduction system, then the first presentation can be used directly. If, on the other hand, it is determined that the desired output audio reproduction system corresponds to the second audio reproduction system, then the transform parameters can be used to obtain the second presentation.

In some embodiments, the first audio reproduction system can comprise a series of speakers at fixed spatial locations and the second audio reproduction system can comprise a set of headphones adjacent a listener's ear. The first or second playback stream presentation may be an echoic or anechoic binaural presentation.

The transform parameters are preferably time varying and frequency dependent.

The transform parameters are preferably determined by minimization of a measure of a difference between: the result of the transform parameters applied to the first playback stream presentation and the second playback stream presentation.

In accordance with another aspect of the present invention, there is provided a method for encoding audio channels or audio objects as a data stream, comprising the steps of: receiving N input audio channels or objects; calculating a set of M signals, wherein M≤N, by forming combinations of the N input audio channels or objects, the set of M signals intended for reproduction on a first audio reproduction system; calculating a set of time-varying transformation parameters W which transform the set of M signals intended for reproduction on first audio reproduction system to an approximation reproduction on a second audio reproduction system, the approximation reproduction approximating any spatialization effects produced by reproduction of the N input audio channels or objects on the second reproduction system; and combining the M signals and the transformation parameters W into a data stream for transmittal to a decoder.

In some embodiments, the transform parameters form a M1×M2 gain matrix, which may be applied directly to the first playback stream presentation to form said approximation of the second playback stream presentation. In some embodiments, M1 is equal to M2, i.e. both the first and second presentations have the same number of channels. In a specific case, both the first and second presentations are stereo presentations, i.e. M1=M2=2.

It will be appreciated by the person skilled in the art that the first presentation stream encoded in the encoder may be a multichannel loudspeaker presentation, e.g. a surround or immersive (3D) loudspeaker presentation such as a 5.1, 7.1, 5.1.2, 5.1.4, 7.1.2, or 7.1.4 presentation. In such a situation, to avoid, or minimize, an increase in computational complexity, according to one embodiment of the present invention, the step of determining a set of transform parameters may include downmixing the first playback stream presentation to an intermediate presentation with fewer channels, In a specific example, the intermediate presentation is a two-channel presentation. In this case, the transform parameters are thus suitable for transforming the intermediate two-channel presentation to the second playback stream presentation. The first playback stream presentation may be a surround or immersive loudspeaker presentation.

The data stream may further include dialog signal estimation parameters, the method further comprising: applying the dialog signal estimation parameters to the signals intended for reproduction on a first audio reproduction system to produce one or more estimated dialog signals; subtracting the one or more estimated dialog signals from the signals intended for reproduction on a first audio reproduction system to produce a dialog reduced intermediate signal; applying the dialog reduced intermediate signal to an acoustic environment simulation process to produce one or more simulated acoustic environment signals; and combining the one or more simulated acoustic environment signals with the audio stream suitable for reproduction on the second audio reproduction system.

The data stream may further include acoustic environment simulation process input signal generation parameters W ($W_F$, $W_E$), the method further comprising: applying the acoustic environment simulation process input signal generation parameters W ($W_F$, $W_E$) to the signals intended for reproduction on a first audio reproduction system to produce one or more acoustic environment simulation process input signals; applying the one or more acoustic environment simulation process input signals to an acoustic environment simulation process to produce one or more simulated acoustic environment signals; and combining the one or more simulated acoustic environment signals with the audio stream suitable for reproduction on the second audio reproduction system.

Preferably, the one or more simulated acoustic environment signals can comprise one or more of: early reflection signals and late reverberation signals. The acoustic environment simulation process can comprise one or more of: an early reflection simulation process and a late reverberation simulation process. The early reflection simulation process can comprise processing one or more of the acoustic environment simulation process input signals though a delay element. In some embodiments the late reverberation simulation process can comprise processing one or more of the acoustic environment simulation process input signals through a feedback delay network.

The data stream preferably can include additional acoustic environment simulation process input signal generation parameters W ($W_F$, $W_E$), with the method further comprising the steps of: applying the additional acoustic environment simulation process input signal generation parameters W ($W_F$, $W_E$) to the signals intended for reproduction on a first audio reproduction system to produce one or more additional acoustic environment simulation process input signals; applying the one or more additional acoustic environment simulation process input signals to an additional acoustic environment simulation process to produce one or more additional simulated acoustic environment signals; and combining the one or more additional simulated acoustic environment signals with one or more of: the one or more simulated acoustic environment signals and the audio stream suitable for reproduction on the second audio reproduction system.

The acoustic environment simulation process can be configured in response to one or more parameters, wherein the parameters depend on one or more of: user settings and information included in the data stream.

In accordance with yet another aspect of the present invention, there is provided an encoder for encoding an input audio stream having one or more audio components, wherein each audio component is associated with a spatial location, the encoder comprising, a first rendering unit for rendering a first playback stream presentation of the input audio stream, the first playback stream presentation being a set of M1 signals intended for reproduction on a first audio reproduction system, a second rendering unit for rendering a second playback stream presentation of the input audio stream, the second playback stream presentation being a set of M2 signals intended for reproduction on a second audio reproduction system, a transform parameter determination unit for determining a set of transform parameters suitable for transforming an intermediate playback stream presentation to an approximation of the second playback stream presentation, wherein the intermediate playback stream presentation is one of the first playback stream presentation, a down-mix of the first playback stream presentation, and an up-mix of the first playback stream presentation, wherein the transform parameters are determined by minimization of a measure of a difference between the approximation of the second playback stream presentation and the second playback stream presentation, and an encoding unit for encoding the first playback stream presentation and the set of transform parameters for transmission to a decoder.

In accordance with yet another aspect of the present invention, there is provided a decoder for decoding playback stream presentations from a data stream, the decoder comprising a core decoder unit configured to:

receive and decode a first playback stream presentation, the first playback stream presentation being a set of M1 signals intended for reproduction on a first audio reproduction system, and receive and decode a set of transform parameters suitable for transforming an intermediate playback stream presentation into an approximation of a second playback stream presentation, the second playback stream presentation being a set of M2 signals intended for reproduction on a second audio reproduction system, wherein the intermediate playback stream presentation is one of the first playback stream presentation, a down-mix of the first playback stream presentation, and an up-mix of the first playback stream presentation, wherein the transform parameters ensure that a measure of a difference between the approximation of the second playback stream presentation and the second playback stream presentation is minimized.

The decoder further comprises a matrix multiplier for applying the transform parameters to the intermediate playback stream presentation to produce the approximation of the second playback stream presentation.

In accordance with a further aspect of the present invention, there is provided a decoder for the decoding of a series of audio channels and/or audio objects from a data stream, the data stream including a set of M signals for reproduction on a first audio reproduction system and transformation parameters W adapted to transform the M signals for reproduction on a second audio reproduction system, the decoder including: a core decoder unit for separating the M signals and W transformation parameters from the data stream, with the M signals being separated into at least high and low frequency bands; a matrix multiplier for applying the W transformation parameters to the M signals to produce a set of frequency separated output signals; and an inverse transformation unit adapted to transform the set of frequency separated output signals to a series of time domain output signals suitable for reproduction on a second audio reproduction system.

In some embodiments the decoder can further include: a reverberation unit adapted to add reverberation to the set of frequency separated output signals before transformation by the inverse transformation unit.

In some embodiments, the first audio reproduction system can comprise a set of speakers and the second audio reproduction system can comprise a set of headphones, with the transformation parameters W providing a binauralization of the set of frequency separated output signals, in the sense that the second playback stream presentation is an echoic or anechoic binaural presentation.

In accordance with a further aspect of the present invention, there is provided an encoder for encoding an input audio stream, having one or more audio components, wherein each audio component is associated with a spatial location, the system including: a first encoding unit for encoding the input audio stream for a first playback modality, outputting a first playback stream presentation; a transform parameter determination unit for determining a series of transformation parameters for mapping the first playback stream presentation to a second playback stream presentation; and a second encoding unit for encoding the first playback stream presentation and the transformation parameters into an output encoding stream.

The transformation parameter determination unit determines the series of transformation parameters through minimization of the magnitude of an error measure between a desired second playback stream presentation and the application of the series of transformation parameters to the first playback stream presentation. Series may refer to the property of having time-varying transformation parameters and/or frequency-dependent transformation parameters. The second playback stream presentation can comprise binauralized audio for headphone playback.

In accordance with a further aspect of the present invention, there is provided a method for producing an audio signal for presentation over headphones, the method comprising the steps of: receiving a data stream including an encoded anechoic binaural signal and acoustic environment simulation process input signal generation parameters W ($W_F$, $W_E$); decoding the encoded anechoic binaural signal to produce a decoded anechoic binaural signal; applying the acoustic environment simulation process input signal generation parameters W ($W_F$, $W_E$) to the decoded anechoic binaural signal to produce one or more acoustic environment simulation process input signals; applying the one or more acoustic environment simulation process input signals to an acoustic environment simulation process to produce one or more simulated acoustic environment signals; and combining the one or more simulated acoustic environment signals and the decoded anechoic binaural signal to produce the audio signal for presentation over headphones.

In some embodiments, the one or more simulated acoustic environment signals are preferably one or more of: early reflection signals and late reverberation signals. The acoustic environment simulation process can comprise one or more of: an early reflection simulation process and a late reverberation simulation process. The early reflection simulation process can comprise processing one or more of the acoustic environment simulation process input signals through a delay element. The late reverberation simulation process can comprise processing one or more of the acoustic environment simulation process input signals through a feedback delay network.

The data stream preferably can include additional acoustic environment simulation process input signal generation parameters W ($W_F$, $W_E$), and the method can further comprise the steps of: applying the additional acoustic environment simulation process input signal generation parameters W ($W_F$, $W_E$) to the decoded anechoic binaural signal to produce one or more additional acoustic environment simulation process input signals; applying the one or more additional acoustic environment simulation process input signals to an additional acoustic environment simulation process to produce one or more additional simulated acoustic environment signals; and combining the one or more additional simulated acoustic environment signals with one or more of: the one or more simulated acoustic environment signals and the decoded anechoic binaural signal.

In accordance with a further aspect of the present invention there is provided a decoder for producing an audio signal for presentation over headphones, the decoder comprising one or more processors configured to: receive a data stream including an encoded anechoic binaural signal and acoustic environment simulation process input signal generation parameters W ($W_F$, $W_E$); decode the encoded anechoic binaural signal to produce a decoded anechoic binaural signal; apply the acoustic environment simulation process input signal generation parameters W ($W_F$, $W_E$) to the decoded anechoic binaural signal to produce one or more acoustic environment simulation process input signals; apply the one or more acoustic environment simulation process input signals to an acoustic environment simulation process to produce one or more simulated acoustic environment signals; and combine the one or more simulated acoustic environment signals and the decoded anechoic binaural signal to produce the audio signal for presentation over headphones.

BRIEF DESCRIPTION OF THE DRAWINGS

Embodiments of the invention will now be described, by way of example only, with reference to the accompanying drawings in which:

FIG. 9b is a schematic block diagram of a simplified version of the decoder in FIG. 9a.

DETAILED DESCRIPTION

The embodiments provide a method for a low bit rate, low complexity representation of channel and/or object based audio that is suitable for loudspeaker and headphone (binaural) playback. This is achieved by (1) creating and encoding a rendering intended for a specific playback reproduction system (for example, but not limited to loudspeakers), and (2) adding additional metadata that allow transformation of that specific rendering into a modified rendering suitable for another reproduction system (for example headphones). The specific rendering may be referred to as a first audio playback stream presentation, while the modified rendering may be referred to as a second audio playback stream presentation. The first presentation may have a set of M1 channels, while the second presentation may have a set of M2 channels. The number of channels may be equal (M1=M2) or different. The metadata may be in the form of a set of parameters, possibly time and frequency varying.

In one implementation, the transformation metadata provides a means for transforming a stereo loudspeaker rendering into a binaural headphone rendering, with the possibility to include early reflections and late reverberation. Furthermore, for object-based audio content, the virtual acoustic attributes, in particular the (relative) level of late reverberation and/or the level, spectral and temporal characteristics of one or more early reflections can be controlled on a per-object basis.

The embodiments are directed to the elimination of artifacts and/or improvement of the reproduction quality and maintaining artistic intent by metadata that guides reproduction on one or more reproduction systems. In particular, the embodiments include metadata with an object, channel or hybrid signal representation that improves the quality of reproduction when the reproduction system layout does not correspond to the intended layout envisioned during content creation. As such, the application and/or effect as a result of the metadata will depend on the intended and actual reproduction systems.

Binaural Pre-Rendered Content Reproduced Over Loudspeakers

As described in the background section, reproduction of binaural pre-rendered content over loudspeakers can result in an unnatural timbre due to the fact that spectral cues inherently present in HRIRs or BRIRs are applied twice; once during pre-rendering, and another time during playback in an acoustic environment. Furthermore, such reproduction of binaural pre-rendered content will inherently have azimuthal localization cues applied twice as well, causing incorrect spatial imaging and localization errors.

Figure 1:
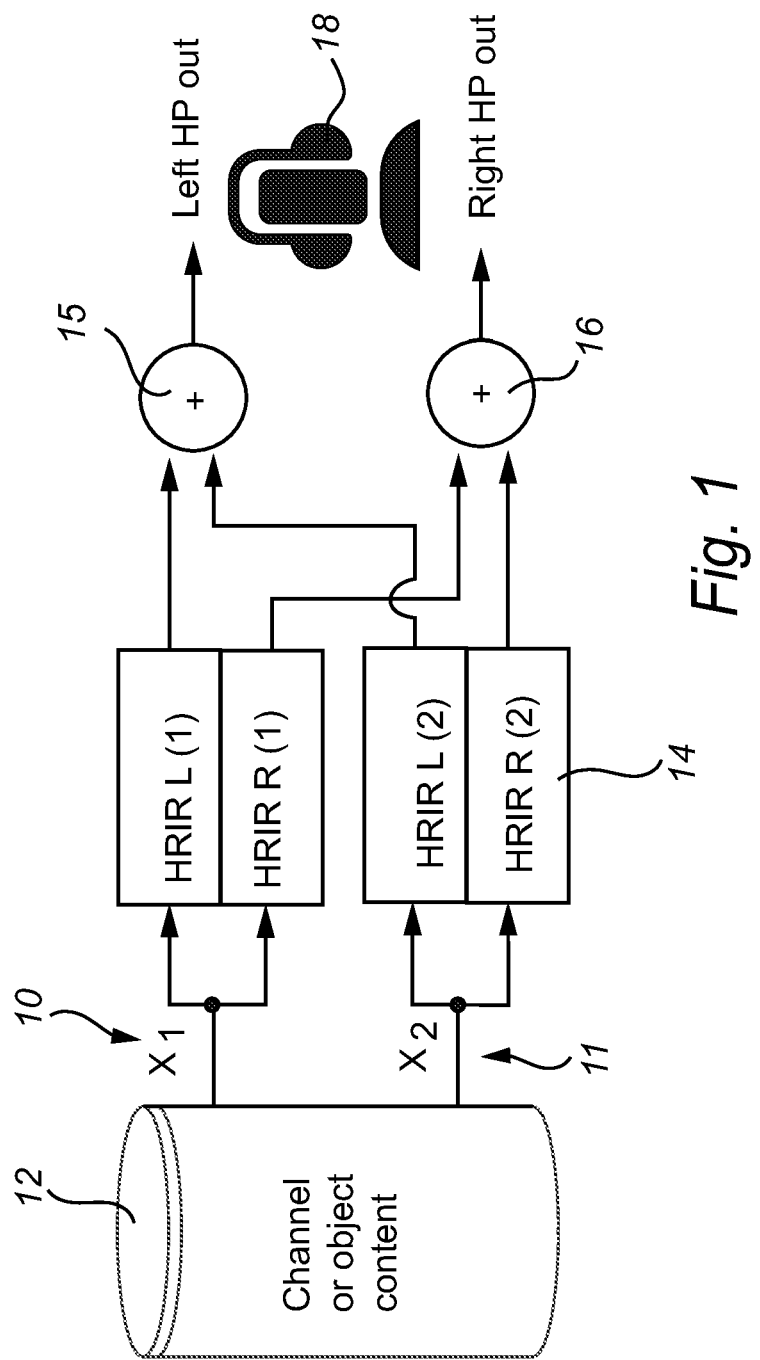
FIG. 1 illustrates a schematic overview of the HRIR convolution process for two sources objects, with each channel or object being processed by a pair of HRIRs/BRIRs.
Figure 2:
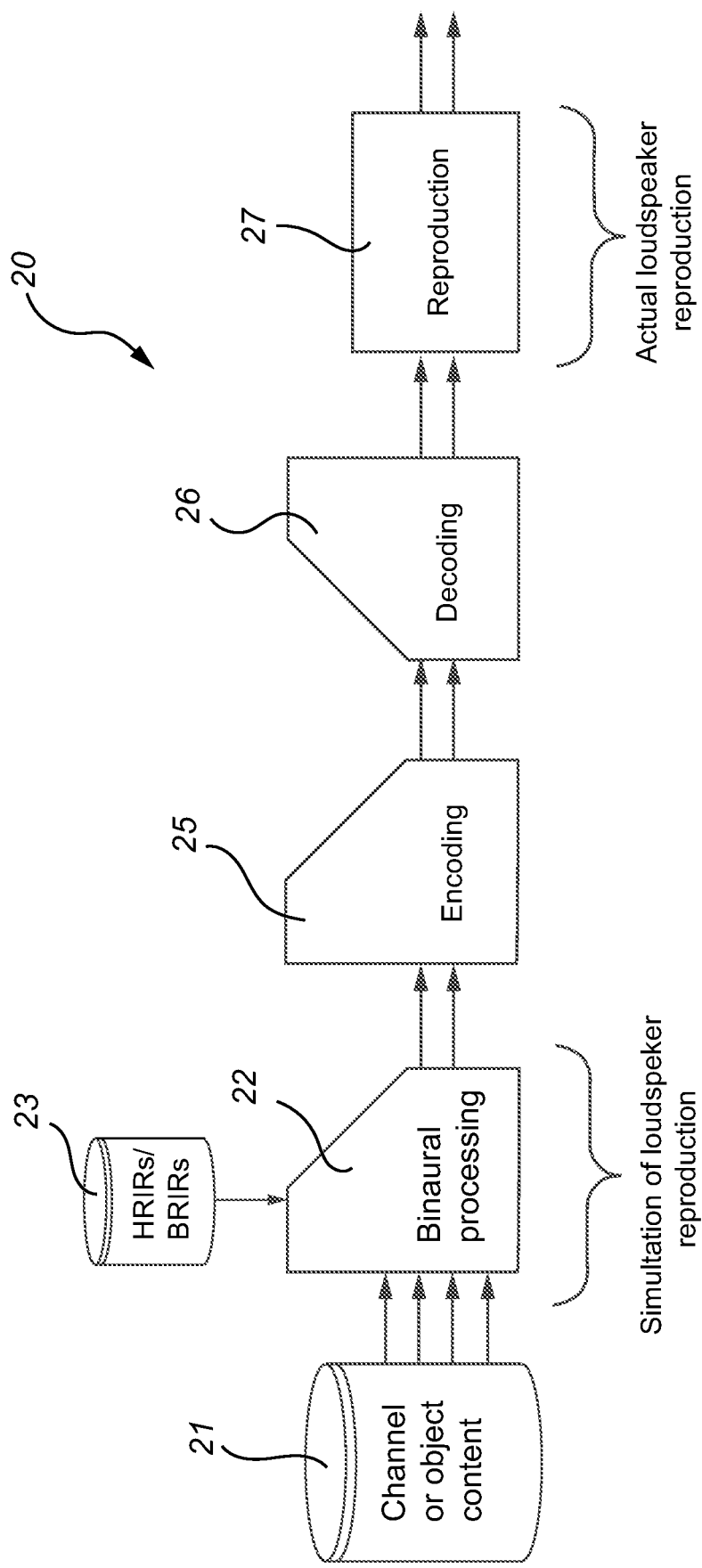
FIG. 2 illustrates schematically the binaural pre-rendered content reproduced over loudspeakers (prior art)

FIG. 2 illustrates this form of processing 20. The channel or object 21 is initially convolved 22 with a HRIR 23 before encoding 25. As such, prior to encoding, the channel or object-based content is subjected to loudspeaker reproduction simulation by means of the HRIR or BRIR processing. Subsequently, the processed signal is encoded 25, decoded 26 and reproduced over loudspeakers 27, introducing the aforementioned artifacts.

The spectral artifacts resulting from applying an acoustic pathway from speakers to eardrums twice can, at least in part, be compensated for by applying a frequency-dependent gain or attenuation during decoding or reproduction. These gain or attenuation parameters can subsequently be encoded and included with the content. For headphone reproduction, these parameters can be discarded, while for reproduction on loudspeakers, the encoded gains are applied to the signals prior to reproduction.

Figure 3:
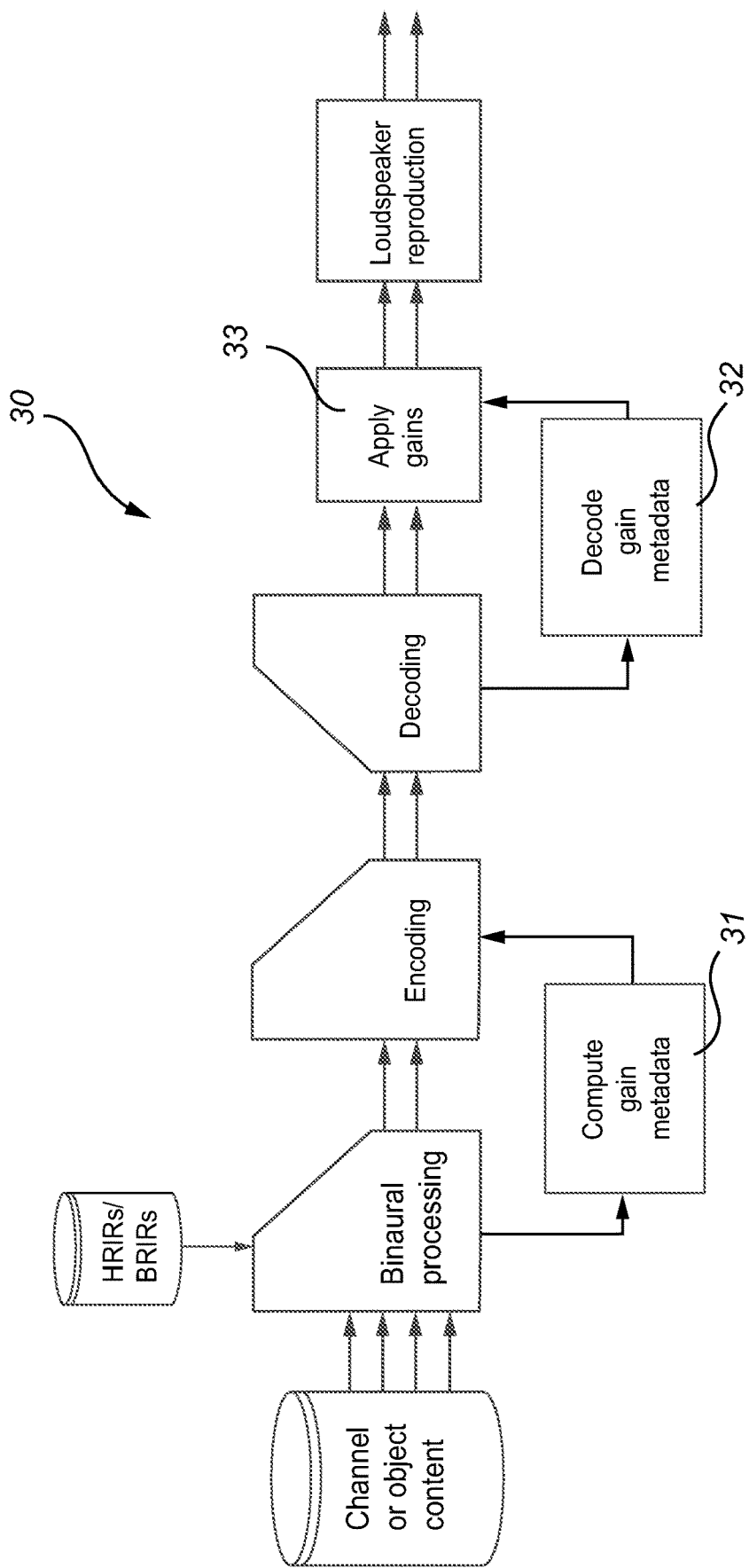
FIG. 3 illustrates schematically the binaural pre-rendered content reproduced over loudspeakers.

One form of suitable consequential processing flow 30 is shown in FIG. 3. In this scheme, when playback is intended for loudspeakers, gain metadata is precomputed 31 when the rendering is created. This metadata is encoded with the binaurally processed signals. During decoding the metadata information is also decoded 32. This is then used to apply gain 33 to the decoded signal to reduce the significance of artifacts. For headphones playback, on the other hand, the stages 31-33 are not required (being discarded) and the decoded information can be directly applied for headphone reproduction.

Implementation Example

In one implementation, to compute the gain metadata 31, the input signals $x_i[n]$ with discrete-time index n and input index i are analyzed in time and frequency tiles. Each of the input signals $x_i[n]$ can be broken up into time frames and each frame can, in turn, be divided into frequency bands to construct time/frequency tiles. The frequency bands can be achieved, for example, by means of a filter bank such as a quadrature mirror filter (QMF) bank, a discrete Fourier transform (DFT), a discrete cosine transform (DCT), or any other means to split input signals into a variety of frequency bands. The result of such transform is that an input signal $x_i[n]$ for input with index i and discrete-time index n is represented by sub-band signals $x_i[k, b]$ for time slot (or frame) k and subband b. The short-term energy in time/frequency tile (K,B) is given by:

$$\sigma^2_{x_i}(K, B) = \sum_{b,k \in B,K} x_i[k, b]x_i^*[k, b],$$

with B, K sets of frequency (b) and time (k) indices corresponding to a desired time/frequency tile.

The discrete-time domain representation of the binaural signals $y_l[n]$, $y_r[n]$, for the left and right ear, respectively, is given by:

$$y_l[n] = \sum_i x_i[n] * h_{l,i}[n]$$

$$y_r[n] = \sum_i x_i[n] * h_{r,i}[n]$$

with the HRIR or BRIR corresponding to the input index i, for the left and right ears, respectively. In other words, the binaural signal pair $y_l[n]$, $y_r[n]$ can be created by a combination of convolution and summation across inputs i. Subsequently, these binaural signals can be converted into time/frequency tiles using the same process as applied to the signals $x_i[k, b]$. For these frequency-domain binaural signals, the short-term energy in time/frequency tile (K,B) can thus be calculated as:

$$\sigma^2_{y_j}(K, B) = \sum_{b,k \in B,K} y_j[k, b]y_j^*[k, b]$$

The gain metadata w(K, B) can now be constructed on the basis of energy preservation in each time/frequency tile summed across input objects i in the numerator and across binaural signals j in the denominator:

$$w^2(K, B) = \frac{\sum_i \sigma^2_{x_i}(K, B)}{\sum_j \sigma^2_{y_j}(K, B)}$$

The metadata w(K, B) can subsequently be quantized, encoded and included in an audio codec bit stream. The decoder will then apply metadata w(K, B) to frame K and band B of both signals $y_l$ and $y_r$ (the input presentation) to produce an output presentation. Such use of a common w(K, B) applied to both $y_l$ and $y_r$ ensures that the stereo balance of the input presentation is maintained.

Besides the method described above, in which the binaural signals $y_l[n]$, $y_r[n]$ are created by means of time-domain convolution, the binaural rendering process may also be applied in the frequency domain. In other words, instead of first computing the binaural signals $y_l[n]$, $y_r[n]$ in the time domain, one can instead convert the input signals $x_i[n]$ to the frequency-domain representation, and apply the HRIR convolution process in the frequency domain to generate the frequency-domain representation of the binaural signals $y_j[k, b]$, for example by frequency-domain fast convolution methods. In this approach, the frequency-domain representation of the binaural signals $y_j[k, b]$ is obtained without requiring these signals to be generated in the time domain, and does not require a filterbank or transform to be applied on the time-domain binaural signals.

Stereo Content Reproduced over Headphones, Including an Anechoic Binaural Rendering In this implementation, a stereo signal intended for loudspeaker playback is encoded, with additional data to enhance the playback of that loudspeaker signal on headphones. Given a set of input objects or channels $x_i[n]$, a set of loudspeaker signals $z_s[n]$ is typically generated by means of amplitude panning gains $g_{i,s}$ that represents the gain of object i to speaker s:

$$z_s[n] = \sum_i g_{i,s} x_i[n]$$

For channel-based content, the amplitude panning gains $g_{i,s}$ are typically constant, while for object-based content, in which the intended position of an object is provided by time-varying object metadata, the gains will consequently be time variant.

Given the signals $z_s[n]$ to be encoded and decoded, it is desirable to find a set of coefficients w such that if these coefficients are applied to signals $z_s[n]$, the resulting modified signals $\hat{y}_l$, $\hat{y}_r$ constructed as:

$$\hat{y}_l = \sum_s w_{s,l} z_s$$

$$\hat{y}_r = \sum_s w_{s,r} z_s$$

closely match a binaural presentation of the original input signals $x_i[n]$ according to:

$$y_l[n] = \sum_i x_i[n] * h_{l,i}[n]$$

$$y_r[n] = \sum_i x_i[n] * h_{r,i}[n]$$

The coefficients w can be found by minimizing the L2 norm E between desired and actual binaural presentation:

$$E = |y_l - \hat{y}_l|^2 + |y_r - \hat{y}_r|^2$$

$$w = \arg\min(E)$$

The solution to minimize the error E can be obtained by closed-form solutions, gradient descent methods, or any other suitable iterative method to minimize an error function. As one example of such solution, one can write the various rendering steps in matrix notation:

$$Y = XH$$

$$Z = XG$$

$$\hat{Y} = XGW = ZW$$

This matrix notation is based on single-channel frame containing N samples being represented as one column:

$$\vec{x}_i = \begin{bmatrix} x_i[0] \\ \vdots \\ x_i[N-1] \end{bmatrix}$$

and matrices as combination of multiple channels $i = [1, \ldots, I]$, each being represented by one column vector in the matrix:

$$X = [\vec{x}_1 \ldots \vec{x}_I]$$

The solution for W that minimizes E is then given by:

$$W = (G^* X^* X G + \in I)^{-1} G^* X^* X H$$

with (*) the complex conjugate transpose operator, I the identity matrix, and $\in$ a regularization constant. This solution differs from the gain-based method in that the signal $\hat{Y}$ is generated by a matrix rather than a scalar W applied to signal Z including the option of having cross-terms (e.g. for example the second signal of $\hat{Y}$ being (partly) reconstructed from the first signal in Z).

Ideally, the coefficients w are determined for each time/frequency tile to minimize the error E in each time/frequency tile.

In the sections above, a minimum mean-square error criterion (L2 norm) is employed to determine the matrix coefficients. Without loss of generality, other well-known criteria or methods to compute the matrix coefficients can be used similarly to replace or augment the minimum mean-square error principle. For example, the matrix coefficients can be computed using higher-order error terms, or by minimization of an L1 norm (e.g., least absolute deviation criterion). Furthermore various methods can be employed including non-negative factorization or optimization techniques, non-parametric estimators, maximum-likelihood estimators, and alike. Additionally, the matrix coefficients may be computed using iterative or gradient-descent processes, interpolation methods, heuristic methods, dynamic programming, machine learning, fuzzy optimization, simulated annealing, or closed-form solutions, and analysis-by-synthesis techniques may be used. Last but not least, the matrix coefficient estimation may be constrained in various ways, for example by limiting the range of values, regularization terms, superposition of energy-preservation requirements and alike.

In practical situations, the HRIR or BRIR $h_{j,i}, h_{r,i}$ will involve frequency-dependent delays and/or phase shifts. Accordingly, the coefficients w may be complex-valued with an imaginary component substantially different from zero.

Figure 4:
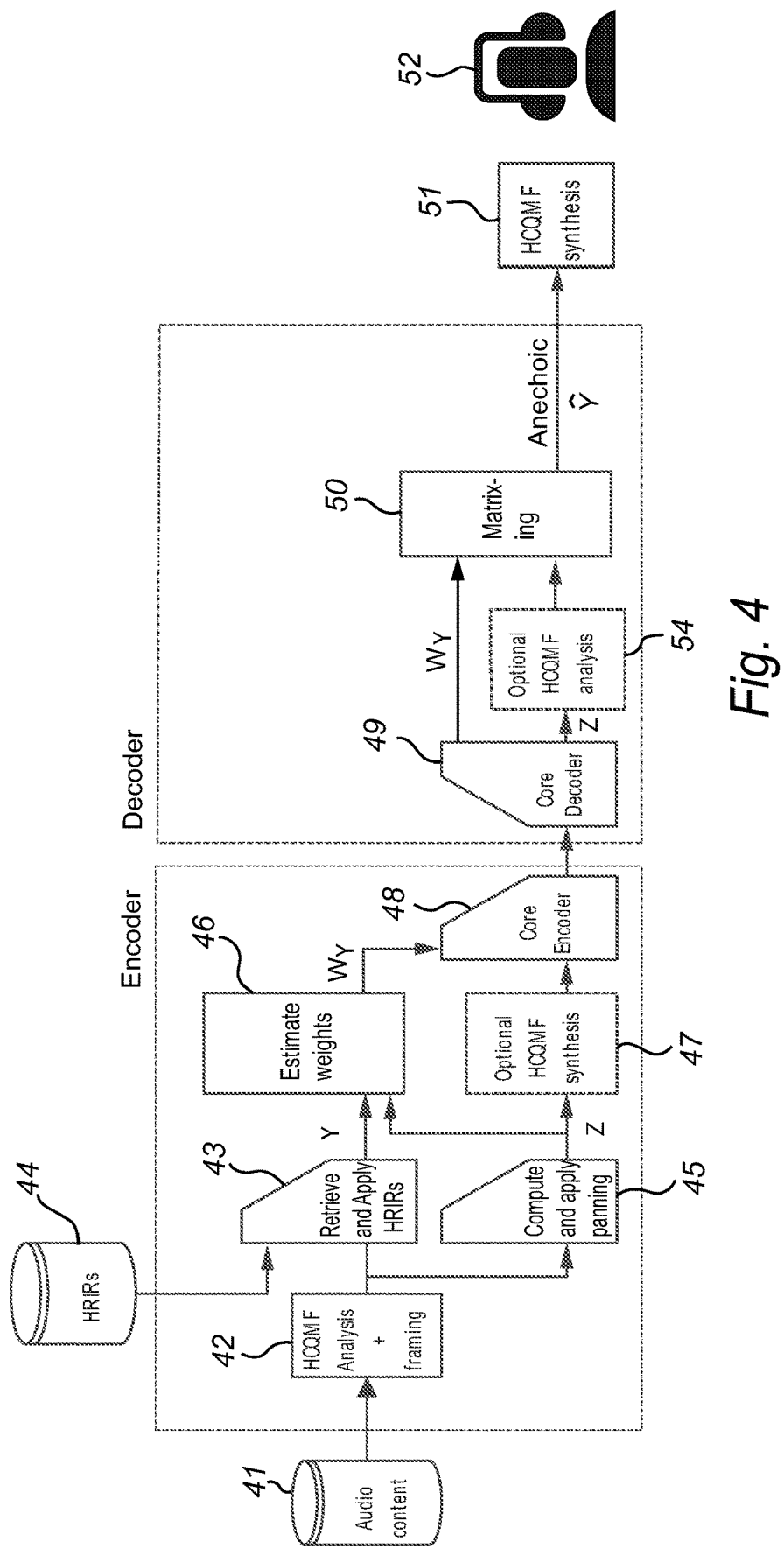
FIG. 4 illustrates schematically the production of coefficients w to process a loudspeaker presentation for headphone reproduction.

One form of implementation of the processing of this embodiment is shown 40 in FIG. 4. Audio content 41 is processed by a hybrid complex quadrature mirror filter (HCQMF) analysis bank 42 into sub-band signals. Subsequently, HRIRs 44 are applied 43 to the filter bank outputs to generate binaural signals Y. In parallel, the inputs are rendered 45 for loudspeaker playback resulting in loudspeaker signals Z. Additionally, the coefficients (or weights) w are calculated 46 from the loudspeaker and binaural signals Y and Z and included in the core coder bitstream 48. Different core coders can be used, such as MPEG-1 Layer 1, 2, and 3, e.g. as disclosed in Brandenburg, K., & Bosi, M. (1997). "Overview of MPEG audio: Current and future standards for low bit-rate audio coding". Journal of the Audio Engineering Society, 45(1/2), 4-21 or Riedmiller, J., Mehta, S., Tsingos, N., & Boon, P. (2015). "Immersive and Personalized Audio: A Practical System for Enabling Interchange, Distribution, and Delivery of Next-Generation Audio Experiences". Motion Imaging Journal, SMPTE, 124(5), 1-23, both hereby incorporated by reference. If the core coder is not able to use sub-band signals as input, the sub-band signals may first be converted to the time domain using a hybrid complex quadrature mirror filter (HCQMF) synthesis filter bank 47.

On the decoding side, if the decoder is configured for headphone playback, the coefficients are extracted 49 and applied 50 to the core decoder signals prior to HCQMF synthesis 51 and reproduction 52. An optional HCQMF analysis filter bank 54 may be required as indicated in FIG. 4 if the core coder does not produce signals in the HCQMF domain. In summary, the signals encoded by the core coder are intended for loudspeaker playback, while loudspeaker-to-binaural coefficients are determined in the encoder, and applied in the decoder. The decoder may further be equipped with a user override functionality, so that in headphone playback mode, the user may select to playback over headphones the conventional loudspeaker signals rather than the binaurally processed signals. In this case, the weights are ignored by the decoder. Finally, when the decoder is configured for loudspeaker playback, the weights may be ignored, and the core decoder signals may be played back over a loudspeaker reproduction system, either directly, or after upmixing or downmixing to match the layout of loudspeaker reproduction system.

It will be evident that the methods described in the previous paragraphs are not limited to using a quadrature mirror filter banks; as other filter bank structures or transforms can be used equally well, such as a short-term windowed discrete Fourier transforms.

This scheme has various benefits compared to conventional approaches. These can include: 1) The decoder complexity is only marginally higher than the complexity for plain stereo playback, as the addition in the decoder consists of a simple (time and frequency-dependent) matrix only, controlled by bit stream information. 2) The approach is suitable for channel-based and object-based content, and does not depend on the number of objects or channels present in the content. 3) The HRTFs become encoder tuning parameters, i.e. they can be modified, improved, altered or adapted at any time without regard for decoder compatibility. With decoders present in the field, HRTFs can still be optimized or customized without needing to modify decoder-side processing stages. 4) The bit rate is very low compared to bit rates required for multi-channel or object-based content, because only a few loudspeaker signals (typically one or two) need to be conveyed from encoder to decoder with additional (low-rate) data for the coefficients w. 5) The same bit stream can be faithfully reproduced on loudspeakers and headphones. 6) A bit stream may be constructed in a scalable manner; if, in a specific service context, the end point is guaranteed to use loudspeakers only, the transformation coefficients w may be stripped from the bit stream without consequences for the conventional loudspeaker presentation. 7) Advanced codec features operating on loudspeaker presentations, such as loudness management, dialog enhancement, etcetera, will continue to work as intended (when playback is over loudspeakers). 8) Loudness for the binaural presentation can be handled independently from the loudness of loudspeaker playback by scaling of the coefficients w. 9) Listeners using headphones can choose to listen to a binaural or conventional stereo presentation, instead of being forced to listen to one or the other.

Extension with Early Reflections

It is often desirable to include one or more early reflections in a binaural rendering that are the result of the presence of a floor, walls, or ceiling to increase the realism of a binaural presentation. If a reflection is of a specular nature, it can be interpreted as a binaural presentation in itself, in which the corresponding HRIRs include the effect of surface absorption, an increase in the delay, and a lower overall level due to the increased acoustical path length from sound source to the ear drums.

Figure 5:
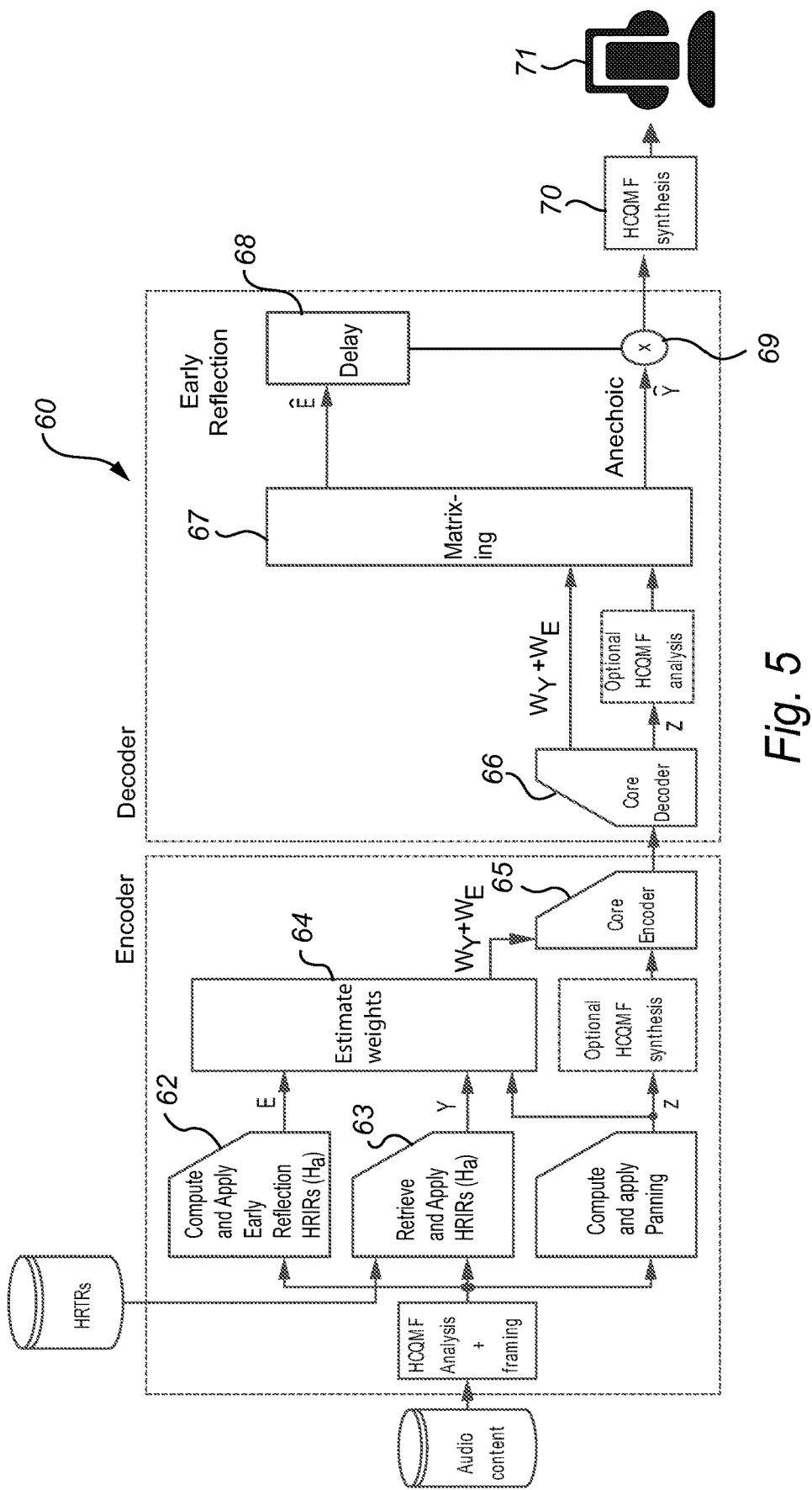
FIG. 5 illustrates schematically the coefficients W ($W_E$) used to reconstruct the anechoic signal and one early reflection (with an additional bulk delay stage) from the core decoder output.

These properties can be captured with a modified arrangement such as that illustrated 60 in FIG. 5, which is a modification on the arrangement of FIG. 4. In the encoder 64, coefficients W are determined for (1) reconstruction of the anechoic binaural presentation from a loudspeaker presentation (coefficients $W_Y$), and (2) reconstruction of a binaural presentation of a reflection from a loudspeaker presentation (coefficients $W_E$). In this case, the anechoic binaural presentation is determined by binaural rendering HRIRs $H_a$ resulting in anechoic binaural signal pair Y, while the early reflection is determined by HRIRs $H_e$ resulting in early reflection signal pair E. To allow the parametric reconstruction of the early reflection from the stereo mix, it is important that the delay due to the longer path length of the early reflection is removed from the HRIRs $H_e$ in the encoder, and that this particular delay is applied in the decoder.

The decoder will generate the anechoic signal pair and the early reflection signal pair by applying coefficients W ($W_Y$; $W_E$) to the loudspeaker signals. The early reflection is subsequently processed by a delay stage 68 to simulate the longer path length for the early reflection. The delay parameter of the block 68 can be included in the coder bit stream, or can be a user-defined parameter, or can be made dependent on the simulated acoustic environment, or can be made dependent on the actual acoustic environment the listener is in.

Extension with Late Reverberation

To include the simulation of late reverberation in the binaural presentation, a late-reverberation algorithm can be employed, such as a feedback-delay network (FDN). An FDN takes as input one or more objects and or channels, and produces (in case of a binaural reverberator) two late reverberation signals. In a conventional algorithm, the decoder output (or a downmix thereof) can be used as input to the FDN. This approach has a significant disadvantage. In many use cases, it can be desirable to adjust the amount of late reverberation on a per-object basis. For example, dialog clarity is improved if the amount of late reverberation is reduced.

In an alternative embodiment per-object or per-channel control of the amount of reverberation can be provided in the same way as anechoic or early-reflection binaural presentations are constructed from a stereo mix.

Figure 6:
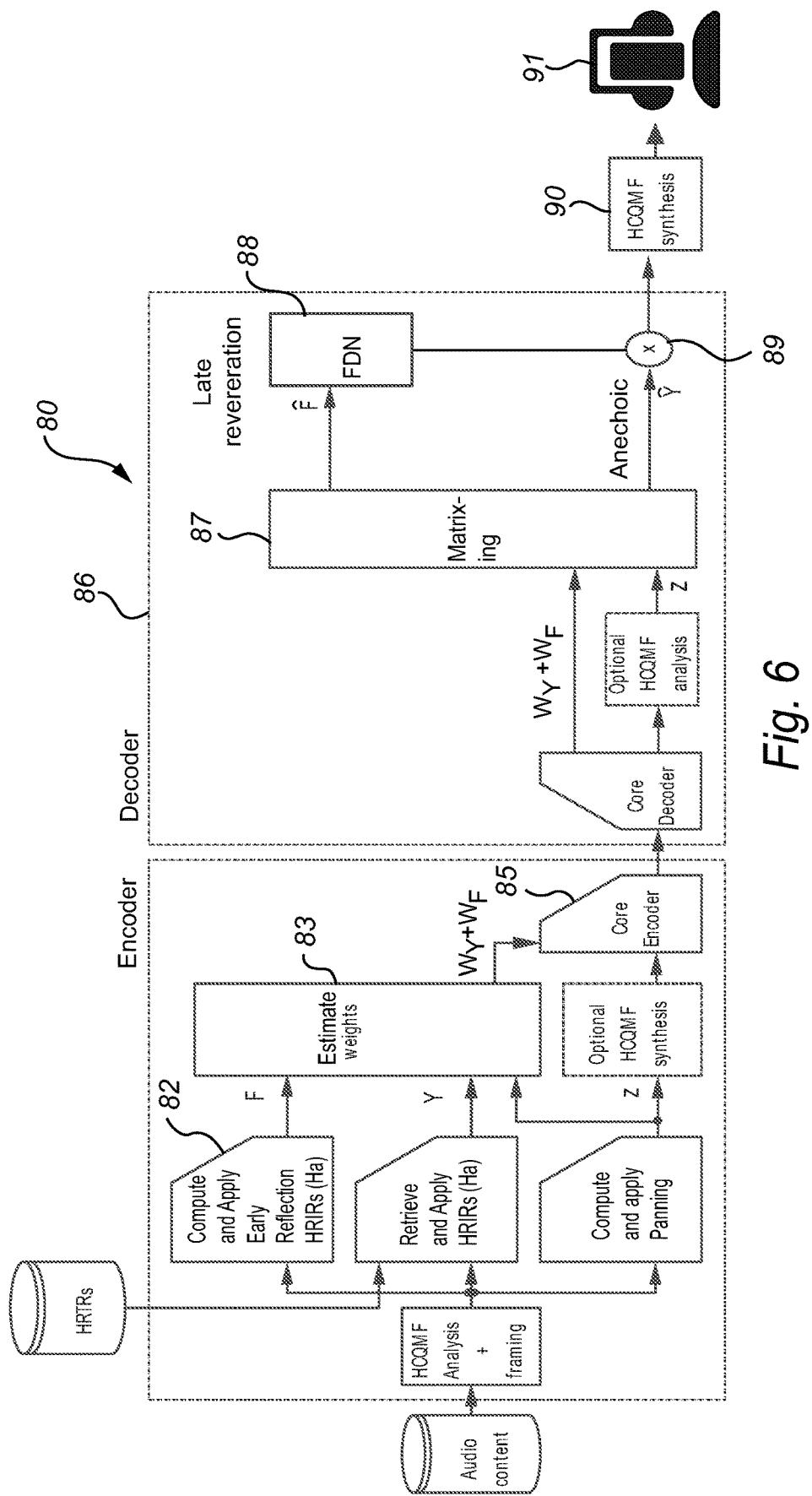
FIG. 6 illustrates schematically the process of using the coefficients W ($W_F$) used to reconstruct the anechoic signal and an FDN input signal from the core decoder output.

As illustrated in FIG. 6, various modifications to the previous arrangements can be made to accommodate further late reverberation. In the encoder 81, an FDN input signal F is computed 82 that can be a weighted combination of inputs. These weights can be dependent on the content, for example as a result of manual labelling during content creation or automatic classification through media intelligence algorithms. The FDN input signal itself is discarded by weight estimation unit 83, but coefficient data $W_F$ that allow estimation, reconstruction or approximation of the FDN input signal from the loudspeaker presentation are included 85 in the bit stream. In the decoder 86, the FDN input signal is reconstructed 87, processed by the FDN 88, and included 89 in the binaural output signal for listener 91.

Additionally, an FDN may be constructed such that, multiple (two or more) inputs are allowed so that spatial qualities of the input signals are preserved at the FDN output. In such cases, coefficient data that allow estimation of each FDN input signal from the loudspeaker presentation are included in the bitstream.

In this case it may be desirable to control the spatial positioning of the object and or channel in respect to the FDN inputs.

In some cases, it may be possible to generate late reverberation simulation (e.g., FDN) input signals in response to parameters present in a data stream for a separate purpose (e.g, parameters not specifically intended to be applied to base signals to generate FDN input signals). For instance, in one exemplary dialog enhancement system, a dialog signal is reconstructed from a set of base signals by applying dialog enhancement parameters to the base signals. The dialog signal is then enhanced (e.g., amplified) and mixed back into the base signals (thus, amplifying the dialog components relative to the remaining components of the base signals). As described above, it is often desirable to construct the FDN input signal such that it does not contain dialog components. Thus, in systems for which dialog enhancement parameters are already available, it is possible to reconstruct the desired dialog free (or, at least, dialog reduced) FDN input signal by first reconstructing the dialog signal from the base signal and the dialog enhancement parameters, and then subtracting (e.g., cancelling) the dialog signal from the base signals. In such a system, dedicated parameters for reconstructing the FDN input signal from the base signals may not be necessary (as the dialog enhancement parameters may be used instead), and thus may be excluded, resulting in a reduction in the required parameter data rate without loss of functionality.

Combining Early Reflections and Late Reverberation

Although extensions of anechoic presentation with early reflection(s) and late reverberation are denoted independently in the previous sections, combinations are possible as well. For example, a system may include: 1) Coefficients $W_Y$ to determine an anechoic presentation from a loudspeaker presentation; 2) Additional coefficients $W_E$ to determine a certain number of early reflections from a loudspeaker presentation; 3) Additional coefficients $W_F$ to determine one or more late-reverberation input signals from a loudspeaker presentation, allowing to control the amount of late reverberation on a per-object basis.

Anechoic Rendering as First Presentation

Figure 7:
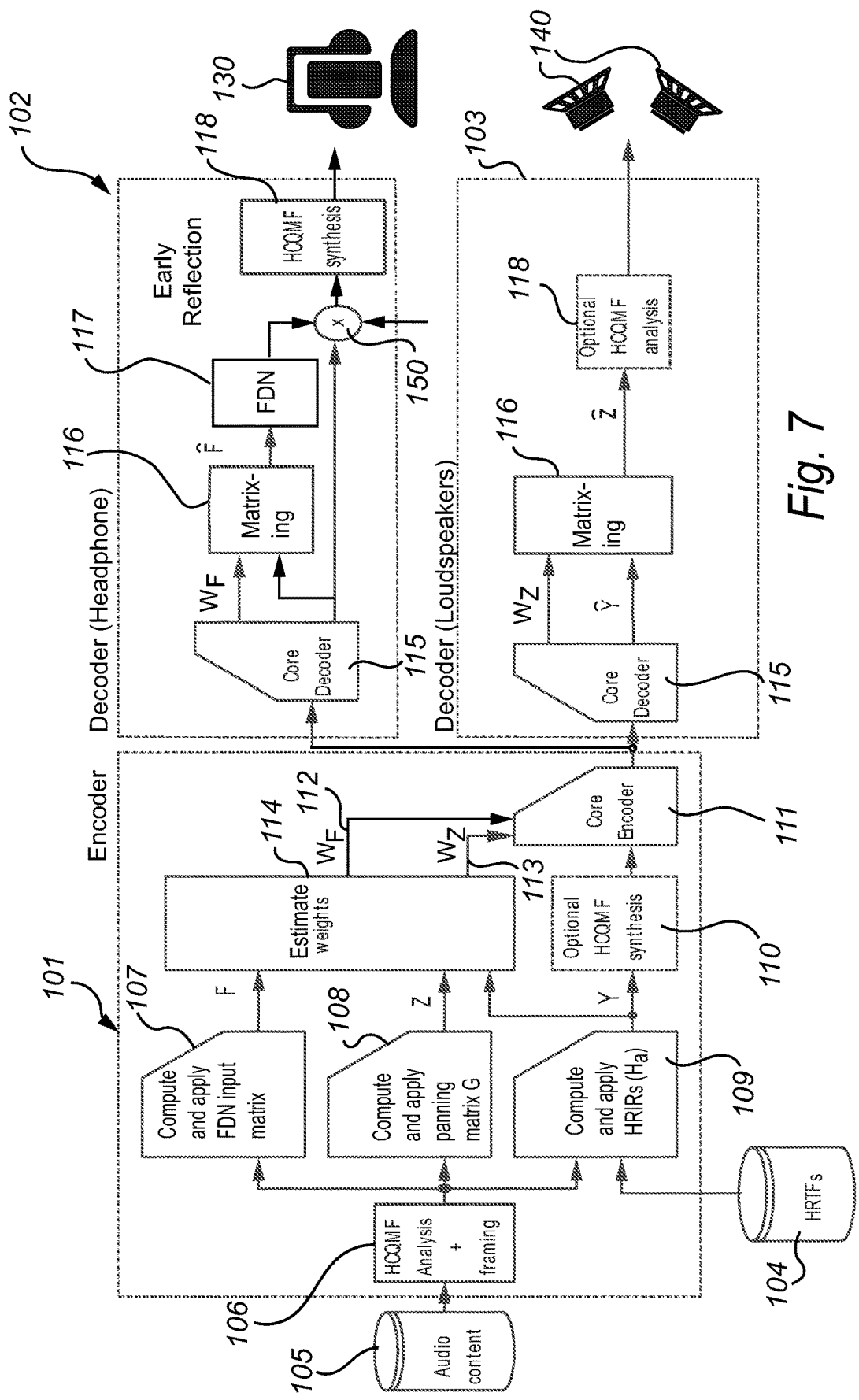
FIG. 7 illustrates schematically the production and processing of coefficients w to process an anechoic presentation for headphones and loudspeakers.

Although the use of a loudspeaker presentation as a first presentation to be encoded by a core coder has the advantage of providing backward compatibility with decoders that cannot interpret or process the transformation data w, the first presentation is not limited to a presentation for loudspeaker playback. FIG. 7 shows a schematic overview of a method 100 for encoding and decoding audio content 105 for reproduction on headphones 130 or loudspeakers 140. The encoder 101 takes the input audio content 105 and processes these signals by HCQMF filterbank 106. Subsequently, an anechoic presentation Y is generated by HRIR convolution element 109 based on an HRIR/HRTF database 104. Additionally, a loudspeaker presentation Z is produced by element 108 which computes and applies a loudspeaker panning matrix G. Furthermore, element 107 produces an FDN input mix F.

The anechoic signal Y is optionally converted to the time domain using HCQMF synthesis filterbank 110, and encoded by core encoder 111. The transformation estimation block 114 computes parameters $W_F$ (112) that allow reconstruction of the FDN input signal F from the anechoic presentation Y, as well as parameters $W_Z$ (113) to reconstruct the loudspeaker presentation Z from the anechoic presentation Y. Parameters 112 and 113 are both included in the core coder bit stream. Alternatively, or in addition, although not shown in FIG. 7, transformation estimation block may compute parameters $W_E$ that allow reconstruction of an early reflection signal E from the anechoic presentation Y.

The decoder has two operation modes, visualized by decoder mode 102 intended for headphone listening 130, and decoder mode 103 intended for loudspeaker playback 140. In the case of headphone playback, core decoder 115 decodes the anechoic presentation Y and decodes transformation parameters $W_F$. Subsequently, the transformation parameters $W_F$ are applied to the anechoic presentation Y by matrixing block 116 to produce an estimated FDN input signal, which is subsequently processed by FDN 117 to produce a late reverberation signal. This late reverberation signal is mixed with the anechoic presentation Y by adder 150, followed by HCQMF synthesis filterbank 118 to produce the headphone presentation 130. If parameters $W_E$ are also present, the decoder may apply these parameters to the anechoic presentation Y to produce an estimated early reflection signal, which is subsequently processed through a delay and mixed with the anechoic presentation Y.

In the case of loudspeaker playback, the decoder operates in mode 103, in which core decoder 115 decodes the anechoic presentation Y, as well as parameters $W_Z$. Subsequently, matrixing stage 116 applies the parameters $W_Z$ onto the anechoic presentation Y to produce an estimate or approximation of the loudspeaker presentation Z. Lastly, the signal is converted to the time domain by HCQMF synthesis filterbank 118 and produced by loudspeakers 140.

Finally, it should be noted that the system of FIG. 7 may optionally be operated without determining and transmitting parameters $W_Z$. In this mode of operation, it is not possible to generate the loudspeaker presentation Z from the anechoic presentation Y. However, because parameters $W_E$ and/or $W_F$ are determined and transmitted, it is possible to generate a headphone presentation including early reflection and/or late reverberation components from the anechoic presentation.

Multi-Channel Loudspeaker Presentation

It will be appreciated by the person skilled in the art that the first playback stream presentation encoded in the encoder may be a multichannel presentation, e.g. a surround or immersive loudspeaker presentation such as a 5.1, 7.1, 7.1.4, etc. presentation. Embodiments of the invention discussed above where the second playback stream presentation is a stereo presentation, e.g. with reference to FIG. 4, will operate in a similar manner, although the size of the matrices will be adjusted. For example, while a 2×2 parameter matrix is sufficient for a stereo-to-stereo transformation, a 5×2 matrix is required for a transformation from a five channel surround presentation to a stereo presentation, and a 6×2 matrix for a transformation from a 5.1 surround presentation (five full bandwidth channels and a low-frequency effects (LFE) channel) to a stereo presentation. As a consequence, the amount of side information needed for presentation transform parameters would increase with the number of channels in the loudspeaker presentation, and also the computational complexity of the decoding process would increase correspondingly.

In order to avoid or minimize such increase in computational complexity when a first presentation with M1 channels is transformed to a second presentation with M2 channels, where M1>M2, e.g. when a surround or immersive loudspeaker presentation is transformed to a binaural stereo presentation, it may be advantageous to downmix the first presentation to an intermediate presentation before determining the transform parameters. For example, a 5.1 surround presentation may be downmixed to a 2.0 stereo loudspeaker presentation.

Figure 8A:
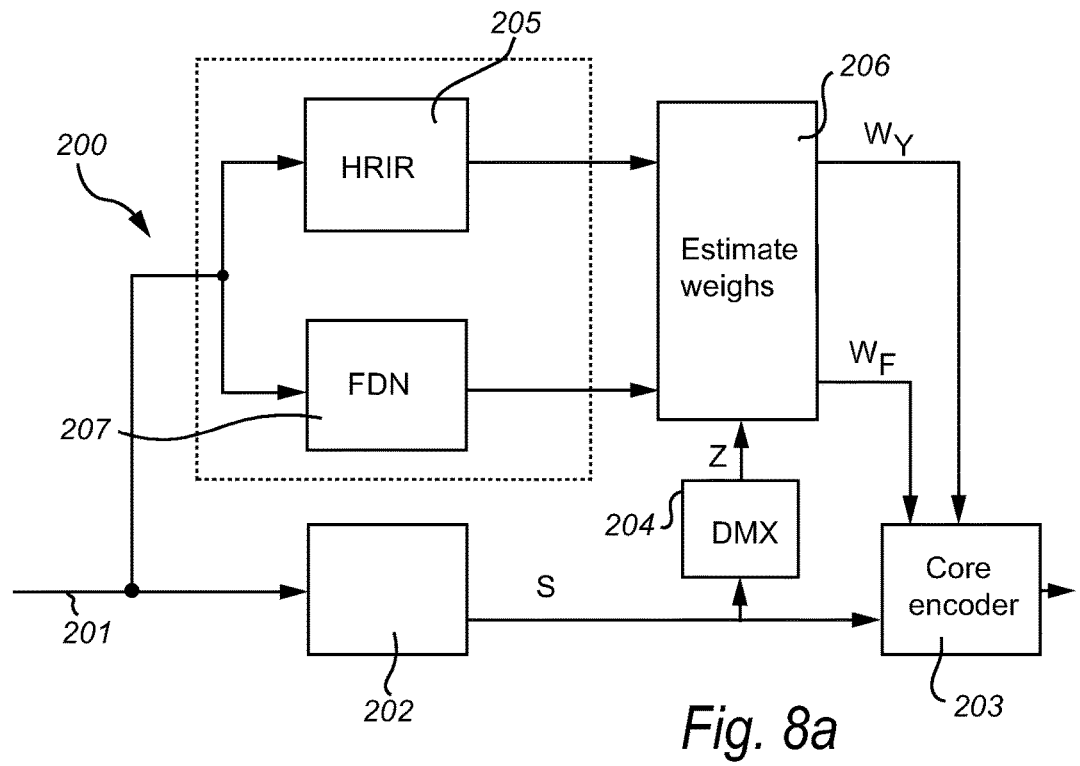
FIG. 8a-8b are schematic block diagrams of an encoder/decoder according to a further embodiment of the present invention.

FIG. 8a shows an encoder 200 where the audio content 201 is rendered by renderer 202 to a 5.1 surround loudspeaker presentation S, which is encoded by the core encoder 203. The 5.1 presentation S is also converted by a downmix module 204 into an intermediate 2-channel (stereo) downmix presentation Z. For example, the left channel of Z ($Z_L$), may be expressed as a weighted sum of the left channel ($S_L$), the left side channel ($S_{LS}$), the center channel ($S_C$) and the low frequency effect channel ($S_{LFE}$) of the surround presentation S, according to the following equation:

$$Z_L = (S_L + a*S_C + b*S_{LS} + c*S_{LFE})$$

where a, b and c are suitable constants, e.g. a=b=sqrt(0.5)= 0.71, c=0.5.

The audio content is also input to a binaural renderer 205 configured to render an anechoic binaural signal Y. A parameter computation block 206 receives the anechoic signal Y and the stereo downmix signal Z and computes stereo-to-anechoic parameters $W_Y$. Compared to FIG. 4 above, the renderer 202 is a multi-channel variant of the renderer 45, as the output in both cases is provided to the core encoder 203/48. Blocks 205 and 206 are in principle identical to blocks 43 and 46.

Further, the encoder may also in include a block 207 (corresponding to block 82 in FIG. 6) for rendering an FDN input signal, and the computation block 206 may then be configured to also compute a set of FDN parameters $W_F$ (corresponding to block 83 in FIG. 6).

Figure 8B:
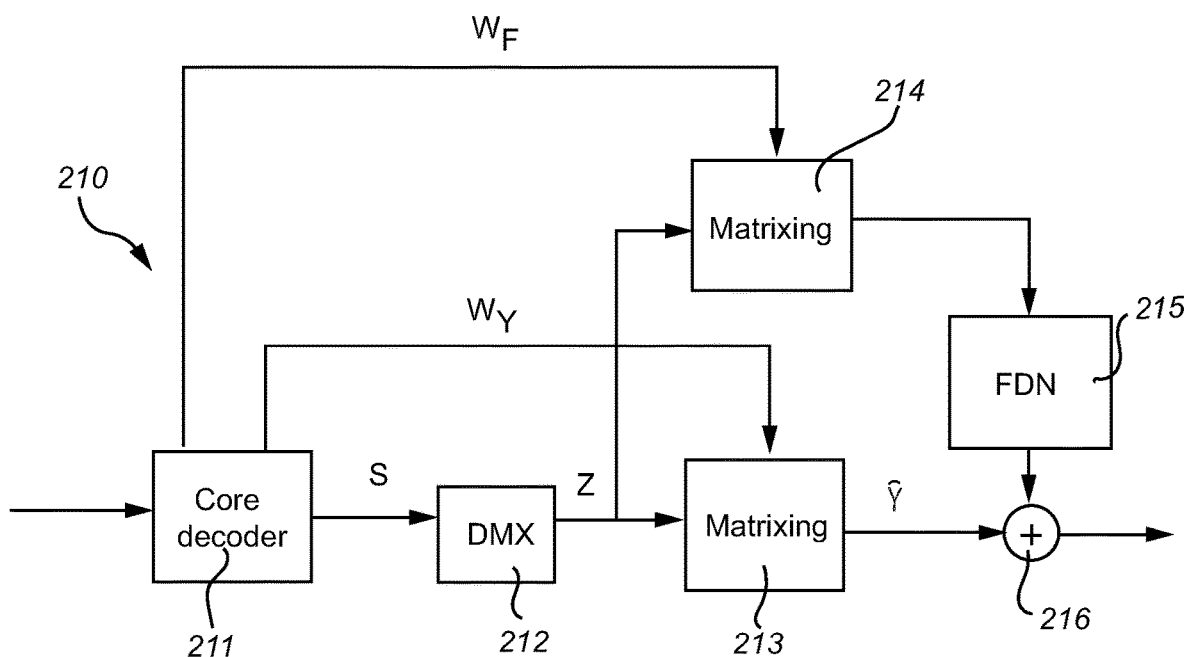

FIG. 8b shows a decoder 210, where a core decoder 211 receives and decodes a 5.1 surround presentation S as well as the parameter sets $W_Y$ and $W_F$. The surround presentation S is converted into a 2-channel (stereo) downmix signal Z by means of a downmix module 212 that operates in the same way as its counterpart 204 in the encoder. A first matrixing block 213 applies the parameters $W_Y$ to the stereo presentation Z to provide a reconstructed anechoic signal $\hat{Y}$. A second matrixing block 214 applies the parameters $W_F$ to the stereo presentation Z to provide a reconstructed FDN input signal. The FDN input signal is used in FDN 215 to provide a late reverberation signal, which is added 216 to the reconstructed anechoic signal $\hat{Y}$ to provide the binaural output. It is noted that the processing in blocks 213-216 is similar to that in the decoder 86 in FIG. 6.

Figure 9A:
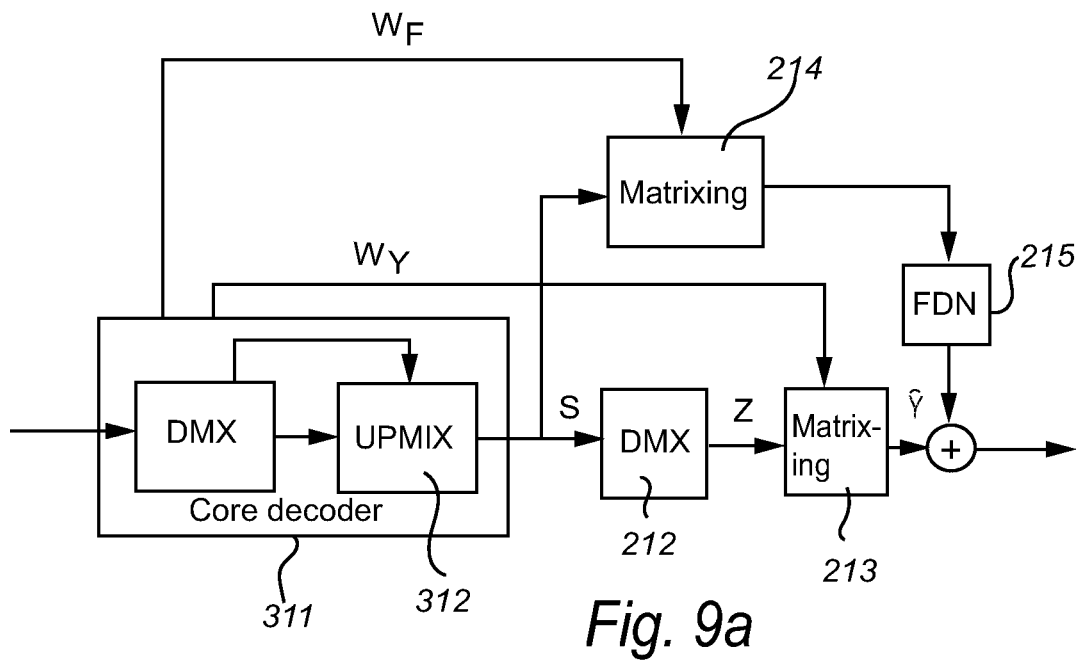
FIG. 9a is a schematic block diagram of a decoder according to a further embodiment of the present invention.

For low target bit-rates it is known to use parametric methods to convey a 5.1 presentation with help of a 2.1 downmix and a set of coupling parameters, see e.g. ETSI TS 103 190-1 V1.2.1 (2015-06). In such a system, the core decoder effectively performs an up-mix in order to provide the decoded 5.1 presentation. If the embodiment in FIG. 8b is implemented in such a decoder, the result will be a decoder as depicted in FIG. 9a. It is noted that the core decoder 311 in FIG. 9a includes an up-mix module 312 for up-mixing a 2.1 presentation into a 5.1 presentation. The 5.1 presentation is then down-mixed to a 2.0 presentation by the downmix module 212, just as in FIG. 8b.

Figure 9B:
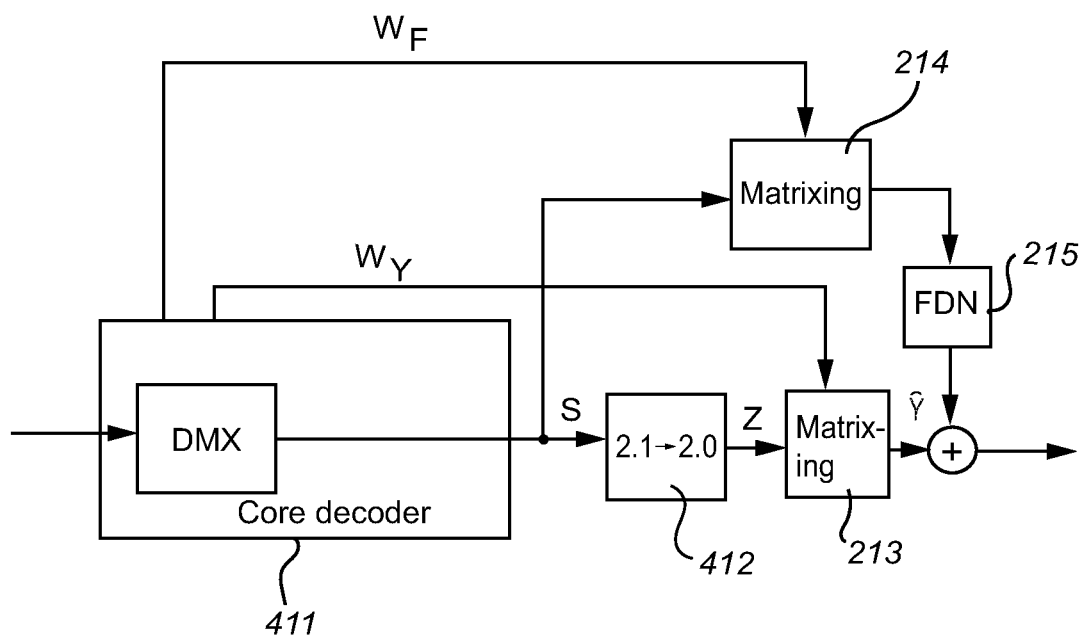

However, in this context, when a 2.1 presentation is already included in the bit stream, the up-mix to 5.1 is not necessary and can be omitted in order to simplify the decoder. Such a simplified decoder is depicted in FIG. 9b. Here, the core decoder 411 only decodes the 2.1 presentation. This presentation is received by a simplified down-mix module 412, which is configured to convert the 2.1 presentation to a 2.0 presentation, according to:

$$Lo = a*L + b*LFE$$

$$Ro = a*R + b*LFE$$

where L, R and LFE are the left and right full bandwidth channels and the low-frequency effects channel of the decoded 2.1 presentation, a and b are suitable constants, taking the effect of the up-mix and down-mix performed by modules 312 and 212 in FIG. 9a into account.

The process described in FIGS. 9a and 9b assumes a 2.1 downmix and corresponding coupling parameters. A similar approach can be employed in a system using for example a 3.1 downmix and corresponding coupling parameters. Alternatively, the system in FIGS. 8a and 8b could also carry additional side information that allows to upmix the 5.1 presentation to an object-based representation, as discussed in ETSI TS 103 190-1 V1.2.1 (2015-06).

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of encoding an input audio stream having one or more audio components, wherein each audio component is associated with a spatial location, the method comprising:
    rendering a first playback stream presentation of said input audio stream, said first playback stream presentation is a set of M1 signals intended for reproduction on a first audio reproduction system;
    rendering a second playback stream presentation of said input audio stream, said second playback stream presentation is a set of M2 signals intended for reproduction on a second audio reproduction system;
    determining a set of transform parameters suitable for transforming an intermediate playback stream presentation to an approximation of the second playback stream presentation, wherein the intermediate playback stream presentation is one of the first playback stream presentation, a down-mix of the first playback stream presentation, and an up-mix of the first playback stream presentation;
    wherein the transform parameters are determined by minimization of a measure of a difference between the approximation of the second playback stream presentation and the second playback stream presentation; and
    encoding the first playback stream presentation and said set of transform parameters for transmission to a decoder.

2. The method of claim 1, wherein one and only one of the first playback stream presentation and the second playback stream presentation is a loudspeaker presentation and/or wherein one and only one of the first playback stream presentation and the second playback stream presentation is an echoic or anechoic binaural presentation.

3. The method of claim 1, wherein said transform parameters are time varying or frequency dependent, or wherein the transform parameters form a set of gains, which is applied directly to the first playback stream presentation to form said approximation of the second playback stream presentation.

4. The method of claim 1, wherein:
    M1=M2=2; or
    M1>2 and M2=2, and the method further comprises forming the intermediate playback stream presentation by down-mixing the first playback stream presentation to a two-channel presentation.

5. The method of claim 4, wherein the first playback stream presentation is a surround or immersive presentation, such as a 5.1, a 7.1 or a 7.1.4 presentation.

6. An encoder for encoding an input audio stream having one or more audio components, wherein each audio com- 1ponent is associated with a spatial location, the encoder comprising one or more audio signal processing components configured to perform the method of claim 1.

7. A non-transitory storage medium comprising a sequence of instructions which, when executed by an audio signal processing device, cause the audio signal processing device to perform the method of claim 1.

8. A method of decoding playback stream presentations from a data stream, the method including the steps of:
  receiving and decoding a first rendered playback stream presentation, said first rendered playback stream presentation being a set of M1 signals intended for reproduction on a first audio reproduction system;
  receiving and decoding a set of transform parameters suitable for transforming an intermediate playback stream presentation into an approximation of a second rendered playback stream presentation, said second rendered playback stream presentation being a set of M2 signals intended for reproduction on a second audio reproduction system, wherein the intermediate playback stream presentation is one of the first rendered playback stream presentation, a down-mix of the first rendered playback stream presentation, and an up-mix of the first rendered playback stream presentation;
  wherein the transform parameters ensure that a measure of a difference between the approximation of the second rendered playback stream presentation and the second rendered playback stream presentation is minimized; and
  applying said transform parameters to said intermediate playback stream presentation to produce said approximation of the second rendered playback stream presentation.

9. The method of claim 8, wherein one and only one of said first and second rendered playback stream presentation is an echoic or anechoic binaural presentation, and/or wherein one and only one of said first and second rendered playback stream presentation is a loudspeaker presentation.

10. The method of claim 8, wherein said transform parameters are time varying and/or frequency dependent, and/or wherein the transform parameters form a set of gains, which is applied directly to the first rendered playback stream presentation.

11. The method of claim 8, wherein:
  M1=M2=2; or
  wherein M1>2 and M2=2, and further comprising forming the intermediate playback stream presentation by down-mixing the first rendered playback stream presentation to a two-channel presentation.

12. The method of claim 11, wherein the first rendered playback stream presentation is a surround or immersive presentation, such as a 5.1, a 7.1 or a 7.1.4 presentation.

13. The method of claim 11, wherein the first rendered playback stream presentation is a 2.1 presentation, and wherein said step of downmixing includes converting the 2.1 presentation to a 2.0 stereo presentation, according to:

$$Lo=a*L+b*LFE$$

$$Ro=a*R+b*LFE$$

where L, R and LFE are the left and right full bandwidth channels and the low-frequency effects channel of the decoded 2.1 presentation, a and b are suitable constants.

14. The method of claim 8, wherein the approximation of the second rendered playback stream presentation is an anechoic binaural presentation, and the method further comprises:
  receiving and decoding one or more additional sets of transform parameters suitable for transforming the intermediate playback stream presentation into one or more acoustic environment simulation process input signals;
  applying the one or more additional sets of transform parameters to the intermediate playback stream presentation to generate the one or more acoustic environment simulation process input signals;
  applying the one or more acoustic environment simulation process input signals to one or more acoustic environment simulation processes to produce one or more simulated acoustic environment signals; and
  combining the one or more simulated acoustic environment signals with the approximation of the second rendered playback stream presentation.

15. The method of claim 14, wherein one or more of the simulated acoustic environment signals is an early reflection signal, one or more of the simulated acoustic environment signals is a late reverberation signal, one or more of the acoustic environment simulation processes is an early reflection simulation process, one or more of the acoustic environment simulation processes is a late reverberation simulation process, and/or one or more of the acoustic environment simulation processes is configured in response to one or more parameters, wherein the parameters depend on one or more of: user settings and information included in the data stream.

16. The method of claim 15, wherein the early reflection simulation process comprises processing one or more of the acoustic environment simulation process input signals through a delay element, and/or the late reverberation simulation process comprises processing one or more of the acoustic environment simulation process input signals through a feedback delay network.

17. The method of claim 8, further comprising:
  receiving and decoding one or more sets of dialogue signal estimation parameters suitable for transforming the intermediate playback stream presentation into one or more estimated dialogue signals;
  applying the one or more sets of dialogue estimation parameters to the intermediate playback stream presentation to generate the one or more estimated dialogue signals;
  subtracting the one or more estimated dialogue signals from the intermediate playback stream presentation to produce one or more dialogue reduced signals;
  applying the one or more dialogue reduced signals to one or more acoustic environment simulation processes to produce one or more simulated acoustic environment signals; and
  combining the one or more simulated acoustic environment signals with the approximation of the second rendered playback stream presentation.

18. A decoder for decoding playback stream presentations from a data stream, the decoder comprising one or more audio signal processing components configured to perform the method of claim 8.

19. A non-transitory storage medium comprising a sequence of instructions which, when executed by an audio signal processing device, cause the audio signal processing device to perform the method of claim 8.

* * * * *